US011598285B2

(12) United States Patent
Stoia et al.

(10) Patent No.: US 11,598,285 B2
(45) Date of Patent: Mar. 7, 2023

(54) METHODS AND SYSTEMS FOR GENERATING POWER AND THERMAL MANAGEMENT HAVING COMBINED CYCLE ARCHITECTURE

(71) Applicant: The Boeing Company, Chicago, IL (US)

(72) Inventors: Michael F. Stoia, Rancho Santa Margarita, CA (US); Garrett W. Ek, O'Fallon, MO (US); Arun Muley, San Pedro, CA (US); Jacob T. Needels, Stanford, CA (US); Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/533,643

(22) Filed: Nov. 23, 2021

(65) Prior Publication Data

US 2022/0260036 A1 Aug. 18, 2022

Related U.S. Application Data

(60) Provisional application No. 63/117,278, filed on Nov. 23, 2020.

(51) Int. Cl.
*F02G 5/00* (2006.01)
*F02C 6/18* (2006.01)
(Continued)

(52) U.S. Cl.
CPC ............. *F02G 5/00* (2013.01); *B64C 13/40* (2013.01); *B64C 19/00* (2013.01); *F02C 6/18* (2013.01);
(Continued)

(58) Field of Classification Search
CPC .... F02G 5/00; B64C 13/40; B64C 19/00; B64C 1/38; B64C 30/00; F02C 6/18;
(Continued)

(56) References Cited

U.S. PATENT DOCUMENTS 4,475,343 A * 10/1984 Dibelius .................... C10J 3/00
60/648
4,827,723 A * 5/1989 Engstrom ............. F01K 23/061
60/683

(Continued)

FOREIGN PATENT DOCUMENTS

CN 101301931 A 11/2008
CN 106640242 A 5/2017
(Continued)

OTHER PUBLICATIONS

Claudio Spadacini; The future of sCO2 Power Cycle Technology—EU Perspective; Exergy Gruppo Industriale Maccaferri; http://sco2symposium.com/papers2018/keynote/Claudio-Spadacini.pdf; 6th International Supercritical CO2 Power Cycles Symposium; Mar. 28, 2018; 23 pages.

(Continued)

*Primary Examiner* — Hoang M Nguyen
(74) *Attorney, Agent, or Firm* — Quinn IP Law

(57) ABSTRACT

Methods and apparatus for cooling a surface on a flight vehicle and generating power include advancing the vehicle at a speed of at least Mach 3 to aerodynamically heat the surface. A first working fluid circulates through a first fluid loop that heats the first working fluid through a first heat intake thermally coupled to the surface and expands the first working fluid in a first thermal engine to generate a first work output. A second fluid loop has a second working fluid that receives heat from the first working fluid and a second thermal engine to generate a second work output. The first and second work outputs are operably coupled to first and (Continued)

second generators, respectively, to power primary or auxiliary systems on the flight vehicle.

20 Claims, 5 Drawing Sheets

(51) Int. Cl.
 *B64C 19/00* (2006.01)
 *B64C 13/40* (2006.01)
(52) U.S. Cl.
 CPC ...... *F05D 2220/64* (2013.01); *F05D 2220/76* (2013.01)
(58) Field of Classification Search
 CPC .. F05D 2220/64; F05D 2220/76; Y02T 50/40; Y02T 50/50; B64D 13/006; B64D 33/00; F01K 7/32; F01K 25/103; F01K 23/10
 USPC ............... 244/76 R; 60/650, 682–684, 655
 See application file for complete search history.

(56) References Cited

U.S. PATENT DOCUMENTS

| | | | |
|---|---|---|---|
| 7,607,318 B2 | 10/2009 | Lui et al. | |
| 7,963,100 B2* | 6/2011 | Bakos | F02K 1/822 60/768 |
| 8,327,651 B2 | 12/2012 | Finney et al. | |
| 9,739,200 B2 | 8/2017 | Vaisman | |
| 9,758,235 B2 | 9/2017 | Clemen, Jr. et al. | |
| 9,810,158 B2 | 11/2017 | Foutch et al. | |
| 10,054,051 B2 | 8/2018 | Foutch et al. | |
| 10,100,744 B2 | 10/2018 | Mackin et al. | |
| 10,221,775 B2 | 3/2019 | Apte et al. | |
| 10,329,022 B2 | 6/2019 | Fox et al. | |
| 10,926,480 B2 | 2/2021 | Yousefiani et al. | |
| 11,465,766 B2* | 10/2022 | Stoia | B64C 1/38 |
| 2007/0266695 A1 | 11/2007 | Lui et al. | |
| 2009/0071166 A1 | 3/2009 | Hagen et al. | |
| 2009/0151321 A1 | 6/2009 | Jarman et al. | |
| 2012/0000205 A1 | 1/2012 | Coffinberry et al. | |
| 2013/0145794 A1 | 6/2013 | Rasmussen et al. | |
| 2014/0260340 A1 | 9/2014 | Vaisman et al. | |
| 2015/0315966 A1 | 11/2015 | Magee et al. | |
| 2015/0315971 A1 | 11/2015 | Reitz et al. | |
| 2015/0330303 A1 | 11/2015 | Delgado, Jr. et al. | |
| 2015/0337730 A1 | 11/2015 | Kupiszewski et al. | |
| 2015/0380748 A1 | 12/2015 | Marich et al. | |
| 2016/0025339 A1 | 1/2016 | Kamath et al. | |
| 2016/0045841 A1 | 2/2016 | Kaplan et al. | |
| 2016/0369705 A1 | 12/2016 | Mackin et al. | |
| 2017/0074102 A1 | 3/2017 | Plante et al. | |
| 2017/0152050 A1 | 6/2017 | Klimpel | |
| 2017/0292412 A1 | 10/2017 | Fonseca | |
| 2018/0037327 A1 | 2/2018 | Hoffjann et al. | |
| 2018/0118351 A1 | 5/2018 | Fox et al. | |
| 2018/0215475 A1 | 8/2018 | Hurt et al. | |
| 2019/0359340 A1* | 11/2019 | Pachidis | B64D 13/06 |
| 2020/0407072 A1 | 12/2020 | Stoia et al. | |
| 2021/0205883 A1 | 7/2021 | Yousefiani et al. | |
| 2021/0205884 A1 | 7/2021 | Yousefiani et al. | |

FOREIGN PATENT DOCUMENTS

| | | |
|---|---|---|
| CN | 107914862 A | 4/2018 |
| CN | 107150810 B | 6/2018 |
| CN | 108657442 A | 10/2018 |
| CN | 108750123 A | 11/2018 |
| CN | 109989833 A | 7/2019 |
| CN | 108298061 B | 3/2020 |
| EP | 2272757 A2 | 1/2011 |
| EP | 3757010 A1 | 12/2020 |
| JP | 2002022298 A | 1/2002 |
| JP | 2009191611 A | 8/2009 |
| WO | 2007035298 A2 | 3/2007 |
| WO | 2014105334 A1 | 7/2014 |

OTHER PUBLICATIONS

Qian Zhu; Innovative power generation systems using supercritical CO2 cycles; Clean Energy, vol. 1, Issue 1, Dec. 2017; pp. 68-79; https://academic.oup.com/ce/article1/1/68/4657149; Nov. 24, 2017.

Junhyun Cho et al.; Research on the Development of a Small-Scale Supercritical Carbon Dioxide Power Cycle Experimental Test Loop; http://sco2symposium.com/papers2016/Testing/049paper.pdf; The 5th International Symposium—Supercritical CO2 Power Cycles; Mar. 28-31, 2016; 12 pages.

* cited by examiner

METHODS AND SYSTEMS FOR GENERATING POWER AND THERMAL MANAGEMENT HAVING COMBINED CYCLE ARCHITECTURE

CROSS-REFERENCE TO RELATED APPLICATIONS

This application claims priority to, and the benefit of, U.S. Provisional Patent Application No. 63/117,278 filed on Nov. 23, 2020, the disclosure of which is hereby incorporated by reference in its entirety.

FIELD

The present disclosure generally relates to high speed flight vehicles and, more specifically, to systems and methods for thermal management and power generation on high speed flight vehicles.

BACKGROUND

Flight vehicles traveling through atmosphere at high speeds may experience extremely high temperatures. When traveling at speeds greater than Mach 3, and more particularly at hypersonic speeds greater than Mach 5, temperatures can locally exceed 1000 degrees Fahrenheit, necessitating the use of high density materials such as superalloys or expensive non-metallic materials such as ceramic matrix composites. Additionally, turbofan and turbojet engines cannot be used at speeds much above Mach 3 without air cooling. Moreover, as speed increases, a greater fraction of the total engine air flow is diverted around the turbomachinery into an augmenter, also called an afterburner, which is essentially a ramjet. As a result, a smaller amount of power is generated by the turbine, therefore the ability of the turbine to generate electrical power for vehicle systems is diminished.

SUMMARY

In accordance with one aspect of the present disclosure, a method of generating power from at least one heat source associated with a flight vehicle comprises advancing the flight vehicle at a flight speed of at least Mach 3. The method further comprises circulating a first working fluid through a first fluid loop including, in sequence, compressing the first working fluid through a first compressor, heating the first working fluid through a first heat intake of the first fluid loop, wherein the first heat intake of the first fluid loop is thermally coupled to the at least one heat source associated with the flight vehicle, expanding the first working fluid in a first thermal engine to generate a first work output from the first thermal engine, cooling the first working fluid, and recirculating the first working fluid to the first compressor. The method also comprises circulating a second working fluid through a second fluid loop including, in sequence, pressurizing the second working fluid through a fluid pressure increasing device, exchanging heat from the first working fluid to the second working fluid through a recuperator, expanding the second working fluid in a second thermal engine to generate a second work output from the second thermal engine, cooling the second working fluid, and recirculating the second working fluid to the fluid pressure increasing device. Still further, the method comprises generating a first source of electric power by operably coupling the first work output of the first thermal engine to a first generator, and generating a second source of electric power by operably coupling the second work output of the second thermal engine to a second generator.

In accordance with another aspect of the present disclosure, a system is provided for generating power from at least one heat source associated with a flight vehicle traveling at a flight speed of at least Mach 3, the system comprising a first fluid loop containing a first working fluid, the first fluid loop including, in sequence, a first compressor for compressing the first working fluid, a first heat intake, located in thermally coupled relation to the at least one heat source associated with the flight vehicle, for heating the first working fluid, and a first thermal engine for expanding the first working fluid and generating a first work output. The system further includes a second fluid loop containing a second working fluid, the second fluid loop including, in sequence, a fluid pressure increasing device for pressurizing the second working fluid, a second thermal engine for expanding the second working fluid and generating a second work output, a recuperator for exchanging heat from a low pressure leg of the first fluid loop, located between the first thermal engine and the first compressor, to a high pressure leg of the second fluid loop, located between the fluid pressure increasing device and the second thermal engine, and a heat sink heat exchanger operably coupled to a low pressure leg located in the second fluid loop between the second thermal engine and the fluid pressure increasing device.

In accordance with a further aspect of the present disclosure, a system is provided for generating power from at least one heat source associated with a flight vehicle traveling at a flight speed of at least Mach 3, the system comprising a first fluid loop containing a first working fluid, the first fluid loop including, in sequence, a first compressor for compressing the first working fluid, a first heat intake, located in thermally coupled relation to the at least one heat source associated with the flight vehicle, for heating the first working fluid, and a first thermal engine for expanding the first working fluid and generating a first work output. The system further includes a second fluid loop containing a second working fluid, the second fluid loop including, in sequence, a fluid pressure increasing device for pressurizing the second working fluid, a second thermal engine for expanding the second working fluid and generating a second work output, a recuperator for exchanging heat from a low pressure leg of the first fluid loop, located between the first thermal engine and the first compressor, to a high pressure leg of the second fluid loop, located between the fluid pressure increasing device and the second thermal engine, and a heat sink heat exchanger operably coupled to a low pressure leg located in the second fluid loop between the second thermal engine and the fluid pressure increasing device. A first generator is operably coupled to the first thermal engine and configured to receive at least a portion of the first work output and generate a first source of electrical power. A second generator is operably coupled to the second thermal engine and configured to receive at least a portion of the second work output and generate a second source of electrical power. A controller is operably coupled to the first compressor and the fluid pressure increasing device, wherein the controller is programmed to execute a method, comprising initiating operation of the first compressor and the fluid pressure increasing device when a flight speed of the flight vehicle is above Mach 3.

The features, functions, and advantages that have been discussed can be achieved independently in various examples, or may be combined in yet other examples, further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of illustrative examples of the present disclosure when read in conjunction with the accompanying drawings, wherein:

DETAILED DESCRIPTION

The figures and the following description illustrate specific examples of the claimed subject matter. It will thus be appreciated that those skilled in the art will be able to devise various arrangements that, although not explicitly described or shown herein, embody the principles of the examples and are included within the scope of the examples. Furthermore, any examples described herein are intended to aid in understanding the principles of construction, operation, or other features of the disclosed subject matter, and are to be construed as being without limitation to such specifically recited examples and conditions. As a result, the inventive concept(s) is not limited to the specific examples described below, but by the claims and their equivalents.

Examples of an integrated cooling and power generation system described herein simultaneously cool a surface of a high speed flight vehicle and generate electric power by circulating working fluids through separate fluid loops of a combined cycle architecture. For example, a first working fluid, such as a supercritical working fluid, is circulated through a first fluid loop, which in exemplary embodiments has a Brayton cycle architecture, having a compressor and a dedicated thermal engine. A second working fluid, which may be a low temperature working fluid such as water, is circulated through a second fluid loop, which in exemplary embodiments has a Rankine cycle architecture, having a fluid pressure increasing device and a dedicated thermal engine. When the flight vehicle travels above Mach 3, portions of the surface of the flight vehicle may reach 650 degrees Fahrenheit or more. At Mach 5, surfaces of the flight vehicle may reach 1000 degrees Fahrenheit or more. The supercritical working fluid in the first fluid loop absorbs heat from the flight vehicle surface, thereby eliminating hot spots and permitting use of lighter and/or less expensive materials. Additionally, the heat absorbed by the first working fluid may be used to generate electrical power for the flight vehicle. The second fluid loop is thermally coupled to the first fluid loop, such as by a recuperator, so that additional electrical power is generated by the thermal engine in the second loop. Thus, the combined cycle architecture more efficiently produces electrical energy from waste heat associated with the high speed flight vehicle.

Figure 1:
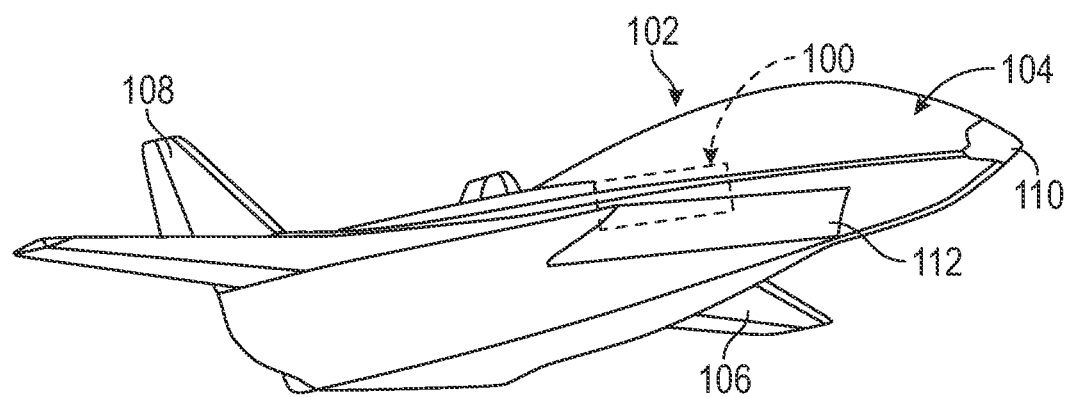
FIG. 1 is a perspective view of a high speed flight vehicle having an integrated cooling and power generation system according to the present disclosure.

FIG. 1 illustrates an example of a high speed flight vehicle 102. The flight vehicle 102 may be operated manned or unmanned as desired. The flight vehicle 102 is just one configuration of a flight vehicle capable of traveling at a speed of at least Mach 3, and other configurations, not shown, may be implemented as desired. For example, the flight vehicle 102 may have a different shape, size, aspect ratio, etc., as desired. Thus, the flight vehicle 102 is merely shown in a particular configuration for purposes of discussion.

In this example, the flight vehicle 102 has a surface 104 exposed to aerodynamic heating. In some examples, the surface 104 is provided on a leading surface, such as on a wing 106, tail 108, nose cap 110, or inlet duct 112 (e.g., inlet air duct) of the flight vehicle 102. During operation of the flight vehicle 102 above Mach 3, or in hypersonic flight (e.g., the flight vehicle 102 moves at hypersonic speeds of Mach 5 and above), the surface 104 is aerodynamically heated. For example, the temperature of the surface 104 can exceed 1000 degrees Fahrenheit.

Figure 2:
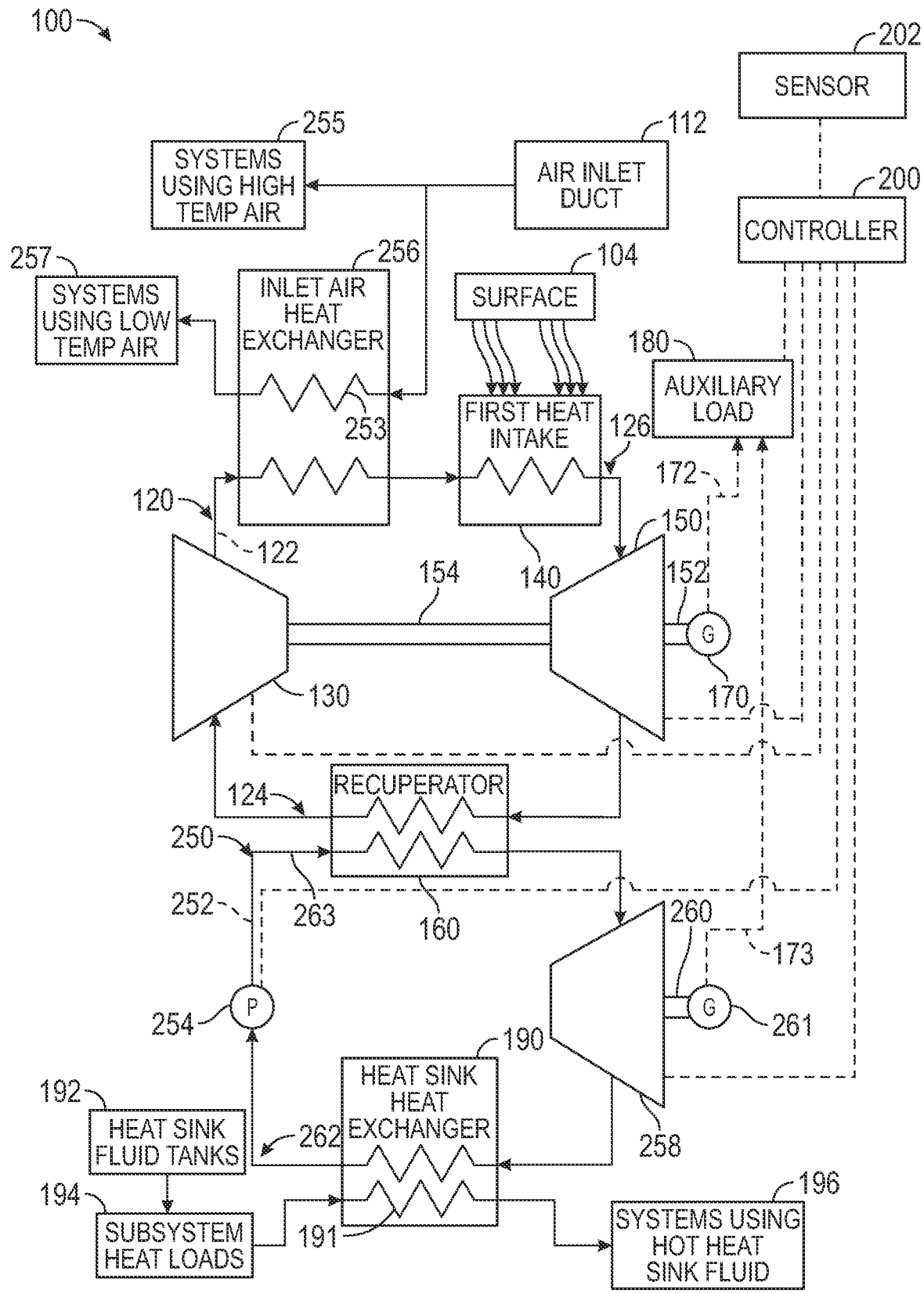
FIG. 2 is a schematic illustration of the integrated cooling and power generation system.
Figure 3:
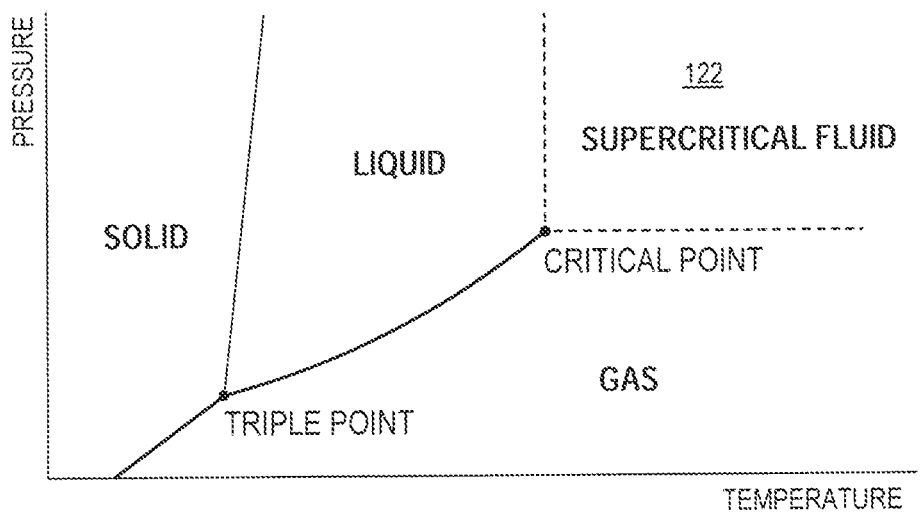
FIG. 3 is a graph illustrating an exemplary supercritical fluid for use in the integrated cooling and power generation system.

The flight vehicle 102 includes a system 100 for generating power from the heated surface 104. Extracting heat from the surface 104 also cools the surface 104, allowing the surface 104 to be formed of materials that do not need to be rated for excessive temperature, thereby lowering material cost and reducing material weight. As best shown in FIG. 2, the system 100 includes a first fluid loop 120 through which is circulated a first working fluid 122. In the illustrated example, the first fluid loop 120 is formed as a closed loop having a Brayton cycle architecture. When the flight vehicle 102 is operated at speeds above Mach 3, heat from the surface 104 is transferred to the first working fluid 122 in the first fluid loop 120, thereby to maintain the first working fluid 122 at a temperature and pressure above its critical point. FIG. 3 graphically illustrates the critical point of a substance, where temperatures and pressures above the critical point will result in a supercritical state. In some examples, the first working fluid is supercritical carbon dioxide.

The system 100 includes components disposed in the first fluid loop 120 for performing a sequence of thermodynamic processes involving transfer of heat and work into and out of the system 100, while varying temperature and pressure of the first working fluid 122 within the system. As schematically illustrated in FIG. 2, the system 100 includes a first compressor 130 for compressing the first working fluid 122 to an increased pressure. The system 100 further includes a first heat intake 140 that absorbs heat from a source external to the first fluid loop 120 to heat the first working fluid 122. In the illustrated example, the external source may be the surface 104 of the flight vehicle 102, and the first heat intake 140 is a section of the first fluid loop 120 that is located in thermally coupled relation to the surface 104. Additionally or alternatively, the external source may be inlet air diverted from the inlet duct 112 of the flight vehicle 102, and an inlet air heat exchanger 256 is provided to transfer heat from the inlet air to the first working fluid 122. In the example illustrated at FIG. 2, an inlet air line 253 passes through the inlet air heat exchanger 256. An upstream end of the inlet air line 253 is fluidly coupled to the inlet duct 112. High temperature air systems 255 on board the flight vehicle 102 are fluidly coupled directly to the inlet duct 112, thus bypassing the inlet air heat exchanger 256. Low temperature air systems 257 are fluidly coupled to a downstream end of the inlet air line 253.

A first thermal engine 150 is disposed in the first fluid loop 120 for extracting a first work output 152 from the first working fluid 122 by expanding the first working fluid 122 to a decreased pressure. While FIG. 2 schematically illustrates the first thermal engine 150 as a turbine, other types of thermal engines capable of extracting work output from a heated and pressurized working fluid may be used. In the illustrated example, the first work output 152 is in the form of a rotating output shaft of the turbine that is mechanically coupled to the first compressor 130 by a shaft 154, thereby to operate the first compressor 130. In alternative examples, the first compressor 130 may be electrically operated, in which case the first work output 152 is mechanically coupled to a generator, which converts mechanical energy into electrical power to drive the first compressor 130. As discussed in greater detail below, that electrical power may be used to also power other vehicle systems. Additionally, it will be appreciated that the first compressor 130 and the first thermal engine 150 generally divide the first fluid loop 120 into a low pressure leg 124, extending downstream of the first thermal engine 150 to an inlet of the first compressor 130, and a high pressure leg 126, extending upstream of the first thermal engine 150 to an outlet of the first compressor 130.

The system 100 further includes a second fluid loop 250 through which is circulated a second working fluid 252. In the illustrated example, the second fluid loop 250 is formed as a closed loop having a Rankine cycle architecture. The second fluid loop 250 extracts heat from the first fluid loop 120 and uses that heat to generate additional electrical power. In some examples, the second working fluid 252 may be a low temperature working fluid, such as water.

The system 100 includes components disposed in the second fluid loop 250 for performing a sequence of thermodynamic processes involving transfer of heat and work into and out of the system 100, while varying temperature and pressure of the second working fluid 252 within the system. As schematically illustrated in FIG. 2, the system 100 includes a fluid pressure increasing device 254 for pressurizing the second working fluid 252. The fluid pressure increasing device 254 may be a pump, a second compressor, or any other device capable of increasing the pressure of the second working fluid 252 in the second fluid loop 250.

A second thermal engine 258 is disposed in the second fluid loop 250 for extracting a second work output 260 from the second working fluid 252 by expanding the second working fluid 252 to a decreased pressure. While FIG. 2 schematically illustrates the second thermal engine 258 as a turbine, other types of thermal engines capable of extracting work output from a heated and pressurized working fluid may be used. In the illustrated example, the second work output 260 is in the form of a rotating output shaft of the turbine that is mechanically coupled to an electric power generating device. In alternative examples, the fluid pressure increasing device 254 may be electrically operated, in which case the second work output 260 is mechanically coupled to a generator, which converts mechanical energy into electrical power to drive the fluid pressure increasing device 254. As discussed in greater detail below, that electrical power may be used to also power other vehicle systems. Additionally, it will be appreciated that the fluid pressure increasing device 254 and the second thermal engine 258 generally divide the second fluid loop 250 into a low pressure leg 262, extending downstream of the second thermal engine 258 to an inlet of the fluid pressure increasing device 254, and a high pressure leg 263, extending upstream of the second thermal engine 258 to an outlet of the fluid pressure increasing device 254.

A recuperator 160 exchanges heat from the first working fluid 122 in the first fluid loop 120 to the second working fluid 252 in the second fluid loop 250. As shown in FIG. 2, the recuperator 160 thermally couples the low pressure leg 124 of the first fluid loop 120 to the high pressure leg 263 of the second fluid loop. The recuperator 160 may be any structure that permits fluid-to-fluid exchange of heat.

In the example illustrated in FIG. 2, the system 100 further includes a heat sink heat exchanger 190 for removing excess heat from the second working fluid 252. The heat sink heat exchanger 190 is disposed in the low pressure leg 262 of the second fluid loop 250, between the second thermal engine 258 and the fluid pressure increasing device 254. By removing heat from the second working fluid 252, the heat sink heat exchanger 190 ensures that the temperature of the second working fluid 252 does not exceed the rated operating temperature range for the fluid pressure increasing device 254. Additionally, the excess heat may be rejected to the surrounding atmosphere or transferred to a secondary fluid in another system on board the flight vehicle 102. In the illustrated example, the heat sink heat exchanger 190 further includes a heat sink line 191 passing through the heat sink heat exchanger 190. An upstream end of the heat sink line 191 fluidly communicates with one or more heat sink fluid tanks 192 carrying heat sink fluid (e.g., fuel, water, or other fluid carried on board the flight vehicle 102). The upstream end of the heat sink line 191 further may communicate with subsystem heat loads 194, such as a thermal energy storage device. A downstream end of the heat sink line 191 may fluidly communicate with other vehicle systems 196 that can use heated heat sink fluid.

The system 100 is configured to generate first and second sources of electrical power 172, 173. As schematically shown in FIG. 2, the system 100 may include a first generator 170 mechanically coupled to the first thermal engine 150. The first generator 170 receives at least a portion of the first work output 152 from the first thermal engine 150 and generates the first source of electrical power 172. Additionally, a second generator 261 is mechanically coupled to the second thermal engine 258 and configured to receive at least a portion of the second work output 260 and generate the second source of electrical power 173. In this example, an auxiliary load 180 is operably coupled to the first and second generators 170, 261 and is configured to operate using the first and second sources of electrical power 172, 173. The auxiliary load 180 may be an environmental control system (ECS), one or more flight control devices (e.g., actuators), an avionics system, a payload, or other device or system requiring electrical power. Still further, the first and second sources of electrical power 172, 173 may also be used to power components of the integrated cooling and power generation system 100, such as the first compressor 130 and the fluid pressure increasing device 254.

In the illustrated example, a controller 200 is provided to control operation of the system 100. In FIG. 2, the controller 200 is operably coupled to the first compressor 130 and the fluid pressure increasing device 254, and is programmed to execute a method that includes initiating operation of the first compressor 130 and the fluid pressure increasing device 254 when one or more operating conditions of the flight vehicle 102 exceeds a pre-determined threshold indicative of favorable conditions for maintaining the first working fluid 122 in a supercritical state. In some examples, the operating condition is a temperature of the surface 104, in which case the controller 200 receives feedback from a sensor 202 configured to detect the temperature of the surface 104 and is programmed to start the first compressor 130 and the fluid pressure increasing device 254 when the surface 104 of the flight vehicle 102 exceeds a threshold temperature. Exemplary threshold temperatures include, but are not limited to, 500 degrees F., 600 degrees F., 700 degrees F., 800 degrees F., 900 degrees F., and 1000 degrees F. In other examples, the operating condition is a flight speed of the flight vehicle 102, which is indicative of temperature of the surface 104. In these examples, the controller 200 receives an indication of flight speed, such as from an input command or sensor 202 when configured to determine flight speed, and is programmed to start the first compressor 130 and the fluid pressure increasing device 254 when the flight vehicle 102 reaches a threshold flight speed. Exemplary threshold flight speeds include, but are not limited to, Mach 3, Mach 3.5, Mach 4, and hypersonic speed. Additionally, the controller 200 may be operably coupled to the first and second thermal engines 150, 258.

In the example illustrated in FIG. 2, the controller 200 further is operably coupled to the first and second generators 170, 261 and the auxiliary load 180, thereby to control operation or other aspects of those components. Because of the thermal efficiency, compact size, and reduced weight afforded by the use of a supercritical working fluid as the first working fluid 122, and the increased power generation efficiency provided by the second fluid loop 250, the integrated cooling and power generation system 100 achieves gravimetric and volumetric power densities that are an order of magnitude greater than batteries or other conventional power sources.

While the specific hardware implementation of the controller 200 is subject to design choices, one particular example includes one or more processors coupled with a current driver. The one or more processors may include any electronic circuits and/or optical circuits that are able to perform the functions described herein. For example, the processor(s) may perform any functionality described herein for controller 200. The processor(s) may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

The system 100 is configured to maintain the first working fluid 122 in a supercritical state during the entire thermodynamic cycle, thereby enabling the use of lighter and more compact turbomachinery. When the first working fluid 122 is carbon dioxide, for example, the critical temperature is approximately 88 degrees F. and the critical pressure is approximately 74 bar. Aerodynamic heating of the surface 104 increases with the speed of the flight vehicle 102. For example, at a speed of Mach 3.5, localized portions of the surface 104 reach 750 degrees F. or more, which would be sufficient to maintain the first working fluid 122 in the supercritical state. At hypersonic speeds in excess of Mach 5, localized portions of the surface 104 may reach 1000 degrees Fahrenheit. Thermodynamic efficiency of the system 100 increases with the temperature of the surface 104. Additionally, the first compressor 130 is sized to maintain a pressure of the first working fluid 122 above the critical pressure throughout the thermodynamic cycle. Because the first working fluid 122 is in a supercritical state, the first compressor 130 and the first thermal engine 150 may have a reduced size and weight, making the system 100 feasible for use on board the flight vehicle 102. Additionally, the illustrated system 100 is a closed loop system that is provided independent of a propulsion system of the flight vehicle 102.

Figure 4:
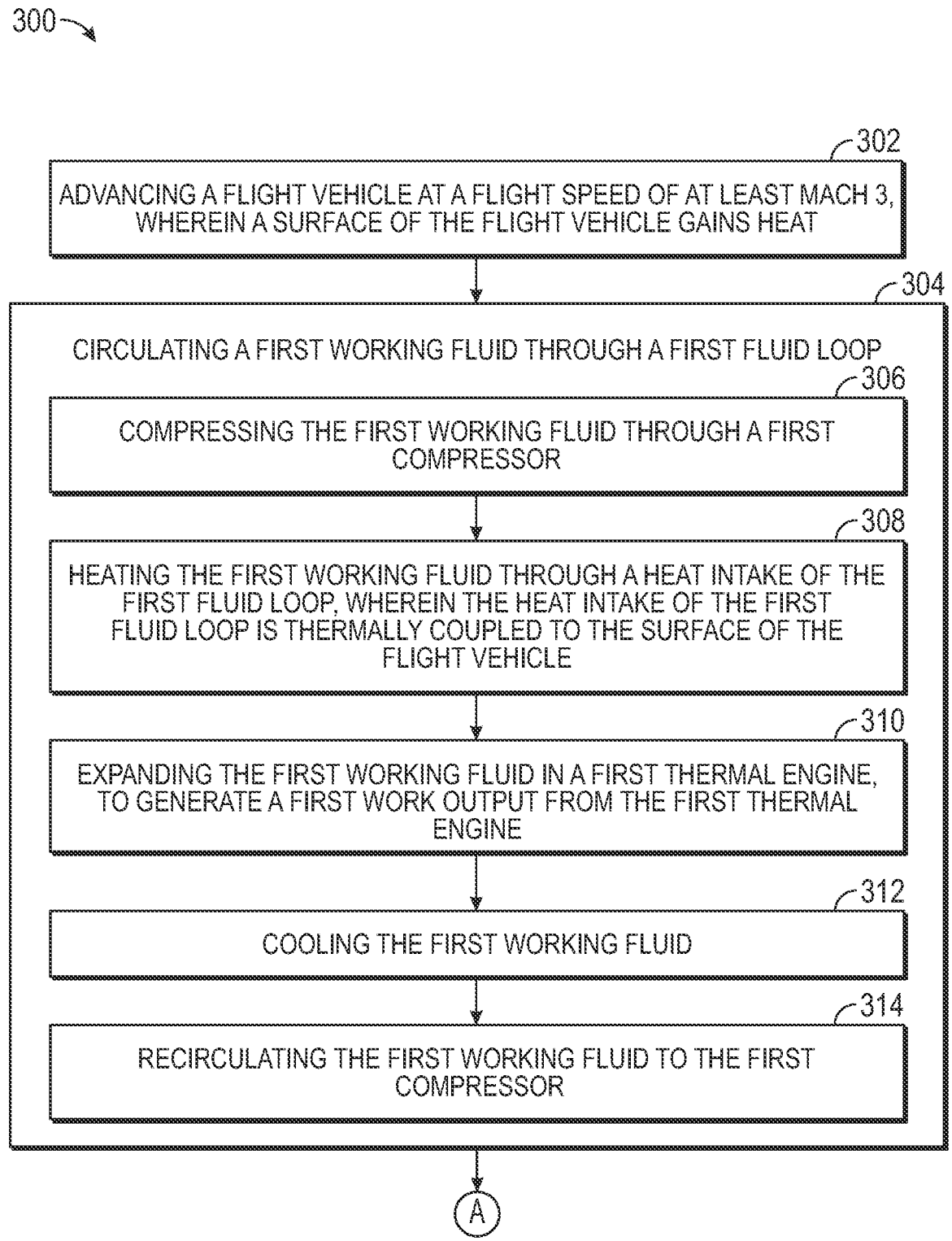
FIG. 4 is a block diagram illustrating a method of cooling a surface of the high speed flight vehicle of FIG. 1, with simultaneous power generation.
Figure 4:
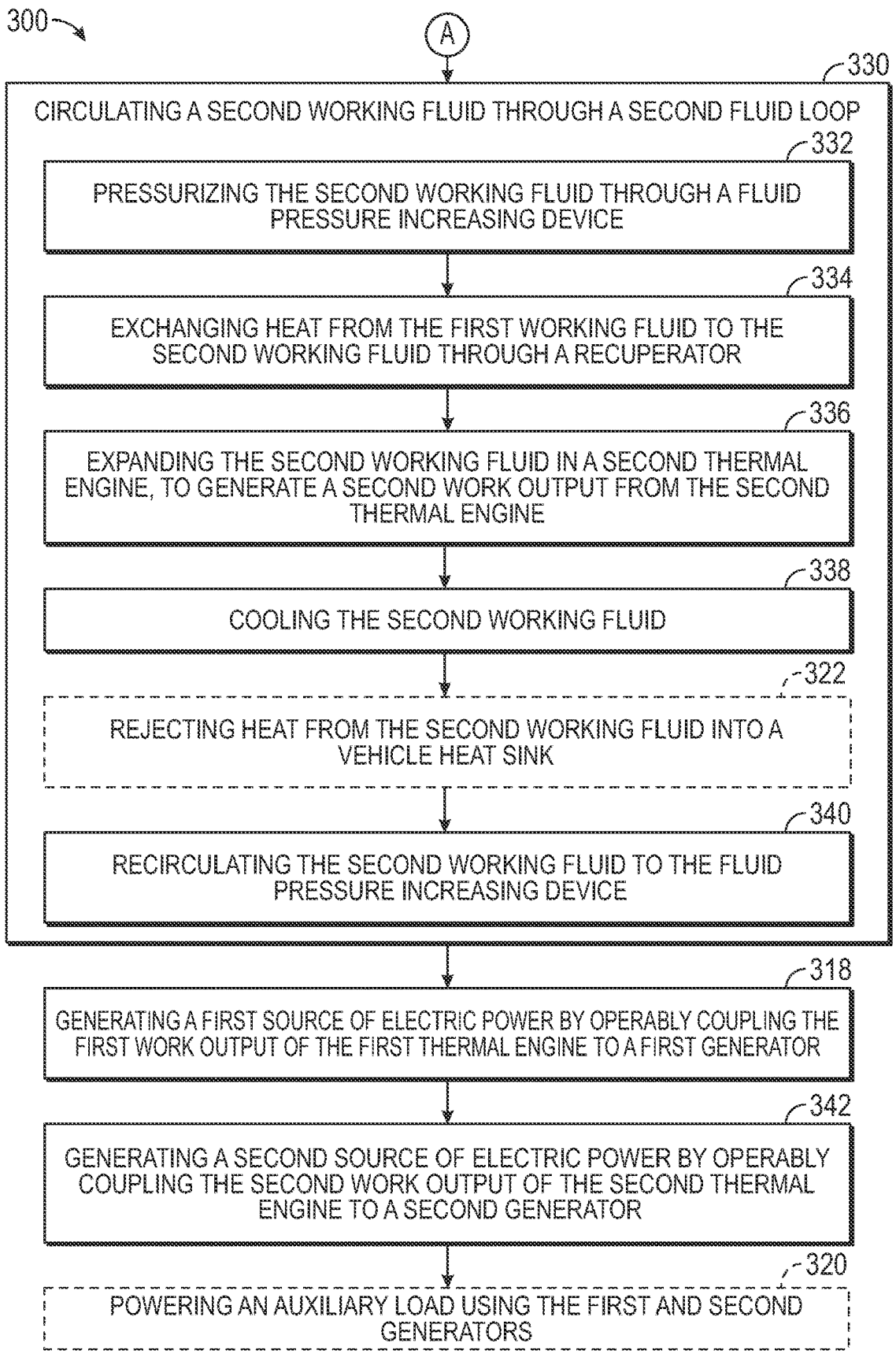

FIG. 4 is a block diagram illustrating a method 300 of cooling the surface 104 of the high speed flight vehicle 102 and generating power on board the flight vehicle 102. The method 300 begins at block 302 by advancing the flight vehicle 102 at a flight speed of at least Mach 3, wherein the surface 104 of the flight vehicle 102 gains heat. At block 304, the first working fluid 122 is circulated through the first fluid loop 120. Circulating the first working fluid 122 through the first fluid loop 120 includes, in sequence, compressing the first working fluid 122 through the first compressor 130 as shown at block 306, heating the first working fluid 122 through the first heat intake 140 of the first fluid loop 120 at block 308, wherein the first heat intake 140 of the first fluid loop 120 is thermally coupled to the surface 104 of the flight vehicle 102, and expanding the first working fluid 122 in a first thermal engine 150 at block 310, thereby to generate a first work output 152 from the thermal engine 150. Circulating the first working fluid 122 through the first fluid loop 120 further includes cooling the first working fluid 122 at block 312, and recirculating the first working fluid 122 to the first compressor 130 at block 314.

The method 300 further may continue at block 330 by circulating the second working fluid 252 through the second fluid loop 250. Circulating the second working fluid 252 through the second fluid loop 250 includes, in sequence, pressurizing the second working fluid 252 through the fluid pressure increasing device 254 as shown at block 332, exchanging heat from the first working fluid 122 to the second working fluid 252 through the recuperator 160 as shown at block 334, expanding the second working fluid 252 in the second thermal engine 258, thereby to generate the second work output 260 from the second thermal engine 258, as shown at block 336, cooling the second working fluid 252 as shown at block 338, and recirculating the second working fluid 252 to the fluid pressure increasing device 254 as shown at block 340.

The method 300 further includes steps for generating electrical power. For example, as schematically shown in FIG. 4, the method 300 includes generating the first source of electric power 172 by mechanically coupling the first work output 152 of the first thermal engine 150 to the first generator 170 at block 318, and generating the second source of electric power 173 by mechanically coupling the second work output 260 of the second thermal engine 258 to the second generator 261 at block 342. The first and second sources of electrical power 172, 173, from the first and second generators 170, 261, may be used to operate the first compressor 130, and the fluid pressure increasing device 254 when those components are powered electrically. Additionally or alternatively, the first and second sources of electric power 172, 173 may be used to power an auxiliary load 180, as shown at block 320.

Still further, the method 300 may optionally include an additional step to reduce the temperature of the second working fluid 252 prior to being recirculated back to the fluid pressure increasing device 254. Specifically, the method 300 may include rejecting heat from the second working fluid 252 using the heat sink heat exchanger 190, as shown at block 322.

The term "sequence", as used herein, generally refers to elements (e.g., unit operations) in order. Such order can refer to process order, such as, for example, the order in which a working fluid flows from one element to another. In an example, a compressor, heat storage unit and turbine in sequence includes the compressor upstream of the heat exchange unit, and the heat exchange unit upstream of the turbine. In such a case, a working fluid can flow from the compressor to the heat exchange unit and from the heat exchange unit to the turbine. A working fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific examples were described herein, the scope is not limited to those specific examples. Rather, the scope is defined by the following claims and any equivalents thereof.

What is claimed is:

1. A method of generating power from at least one heat source associated with a flight vehicle, the method comprising:
    advancing the flight vehicle at a flight speed of at least Mach 3;
    circulating a first working fluid through a first fluid loop including, in sequence:
        compressing the first working fluid through a first compressor;
        heating the first working fluid through a first heat intake of the first fluid loop, wherein the first heat intake of the first fluid loop is thermally coupled to the at least one heat source associated with the flight vehicle;
        expanding the first working fluid in a first thermal engine to generate a first work output from the first thermal engine;
        cooling the first working fluid; and
        recirculating the first working fluid to the first compressor;
    circulating a second working fluid through a second fluid loop including, in sequence:
        pressurizing the second working fluid through a fluid pressure increasing device;
        exchanging heat from the first working fluid to the second working fluid through a recuperator;
        expanding the second working fluid in a second thermal engine to generate a second work output from the second thermal engine;
        cooling the second working fluid; and
        recirculating the second working fluid to the fluid pressure increasing device;
    generating a first source of electric power by operably coupling the first work output of the first thermal engine to a first generator; and
    generating a second source of electric power by operably coupling the second work output of the second thermal engine to a second generator.

2. The method of claim 1, in which the at least one heat source associated with the flight vehicle comprises a first surface of the flight vehicle.

3. The method of claim 1, in which the at least one heat source associated with the flight vehicle comprises heated air from an inlet duct of the flight vehicle.

4. The method of claim 1, in which the first compressor comprises an electric-powered compressor operably coupled to the first generator.

5. The method of claim 4, in which the fluid pressure increasing device comprises an electric-powered fluid pressure increasing device operably coupled to the second generator.

6. The method of claim 1, further comprising powering an auxiliary load using the first generator and the second generator.

7. The method of claim 1, further comprising rejecting heat from the second working fluid via a heat sink heat exchanger prior to recirculating the second working fluid to the fluid pressure increasing device.

8. The method of claim 1, in which the first working fluid comprises a first supercritical working fluid, and in which the second working fluid comprises a low temperature working fluid.

9. A system for generating power from at least one heat source associated with a flight vehicle traveling at a flight speed of at least Mach 3, the system comprising:
    a first fluid loop containing a first working fluid, the first fluid loop including, in sequence:
        a first compressor for compressing the first working fluid;
        a first heat intake, located in thermally coupled relation to the at least one heat source associated with the flight vehicle, for heating the first working fluid; and
        a first thermal engine for expanding the first working fluid and generating a first work output; and
    a second fluid loop containing a second working fluid, the second fluid loop including, in sequence:
        a fluid pressure increasing device for pressurizing the second working fluid;
        a second thermal engine for expanding the second working fluid and generating a second work output;
        a recuperator for exchanging heat from a low pressure leg of the first fluid loop, located between the first thermal engine and the first compressor, to a high pressure leg of the second fluid loop, located between the fluid pressure increasing device and the second thermal engine; and a heat sink heat exchanger operably coupled to a low pressure leg located in the second fluid loop between the second thermal engine and the fluid pressure increasing device.

10. The system of claim 9, further comprising a first generator operably coupled to the first thermal engine and configured to receive at least a portion of the first work output and generate a first source of electrical power.

11. The system of claim 10, further comprising a second generator operably coupled to the second thermal engine and configured to receive at least a portion of the second work output and generate a second source of electrical power.

12. The system of claim 11, further comprising a controller operably coupled to the first compressor and the fluid pressure increasing device, wherein the controller is programmed to execute a method, comprising initiating operation of the first compressor and the fluid pressure increasing device when an operating condition of the flight vehicle exceeds a predetermined threshold.

13. The system of claim 12, in which the operating condition of the flight vehicle comprises a flight speed of the flight vehicle.

14. The system of claim 9, in which the at least one heat source associated with the flight vehicle comprises a first surface of the flight vehicle.

15. The system of claim 9, in which the at least one heat source associated with the flight vehicle comprises heated air from an inlet duct of the flight vehicle.

16. The system of claim 9, in which the first working fluid comprises a first supercritical working fluid, and in which the second working fluid comprises a low temperature working fluid.

17. A system for generating power from at least one heat source associated with a flight vehicle traveling at a flight speed of at least Mach 3, the system comprising:

a first fluid loop containing a first working fluid, the first fluid loop including, in sequence:

a first compressor for compressing the first working fluid;

a first heat intake, located in thermally coupled relation to the at least one heat source associated with the flight vehicle, for heating the first working fluid; and a first thermal engine for expanding the first working fluid and generating a first work output; and a second fluid loop containing a second working fluid, the second fluid loop including, in sequence:

a fluid pressure increasing device for pressurizing the second working fluid;

a second thermal engine for expanding the second working fluid and generating a second work output;

a recuperator for exchanging heat from a low pressure leg of the first fluid loop, located between the first thermal engine and the first compressor, to a high pressure leg of the second fluid loop, located between the fluid pressure increasing device and the second thermal engine; and a heat sink heat exchanger operably coupled to a low pressure leg located in the second fluid loop between the second thermal engine and the fluid pressure increasing device;

a first generator operably coupled to the first thermal engine and configured to receive at least a portion of the first work output and generate a first source of electrical power;

a second generator operably coupled to the second thermal engine and configured to receive at least a portion of the second work output and generate a second source of electrical power; and a controller operably coupled to the first compressor and the fluid pressure increasing device, wherein the controller is programmed to execute a method, comprising initiating operation of the first compressor and the fluid pressure increasing device when a flight speed of the flight vehicle is above Mach 3.

18. The system of claim 17, in which the at least one heat source associated with the flight vehicle comprises a first surface of the flight vehicle.

19. The system of claim 17, further comprising an auxiliary load operably coupled to each of the first generator and the second generator.

20. The system of claim 19, in which the heat sink heat exchanger comprises a heat sink fluid or a thermal energy storage device.

* * * * *